(12) United States Patent  
Littlefield (10) Patent No.: US 9,738,036 B2  
(45) Date of Patent: Aug. 22, 2017

(54) METHOD OF MANUFACTURE OF A SURGICAL MODEL FOR AN ANATOMICAL FEATURE

(71) Applicant: CRANIAL TECHNOLOGIES, INC., Tempe, AZ (US)

(72) Inventor: Timothy R Littlefield, Phoenix, AZ (US)

(73) Assignee: CRANIAL TECHNOLOGIES, INC., Tempe, AZ (US)

( * ) Notice: Subject to any disclaimer, the term of this patent is extended or adjusted under 35 U.S.C. 154(b) by 443 days.

(21) Appl. No.: 14/556,399

(22) Filed: Dec. 1, 2014

(65) Prior Publication Data

US 2016/0151976 A1  Jun. 2, 2016

(51) Int. Cl.

| | | |
|---|---|---|
| G06T 17/00 | (2006.01) | |
| B29C 67/00 | (2017.01) | |
| G05B 19/4099 | (2006.01) | |
| G05B 19/4093 | (2006.01) | |
| G06T 7/579 | (2017.01) | |
| G06T 7/593 | (2017.01) | |
| H04N 13/02 | (2006.01) | |
| B33Y 50/02 | (2015.01) | |
| B33Y 80/00 | (2015.01) | |

(52) U.S. Cl.
CPC ...... *B29C 67/0088* (2013.01); *G05B 19/4099* (2013.01); *G05B 19/40937* (2013.01); *G06T 7/579* (2017.01); *G06T 7/596* (2017.01); *B33Y 50/02* (2014.12); *B33Y 80/00* (2014.12); *G05B 2219/35134* (2013.01); *G05B 2219/35143* (2013.01); *G05B 2219/49007* (2013.01); *G06T 2207/30052* (2013.01); *H04N 13/0239* (2013.01); *H04N 13/0282* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 2004/0179728 A1* | 9/2004 | Littlefield | G06T 1/0007 382/154 |
| 2006/0221072 A1* | 10/2006 | Se | G01C 11/06 345/420 |

(Continued)

*Primary Examiner* — Paul Yanchus, III  
(74) *Attorney, Agent, or Firm* — Donald J Lenkszus (57) ABSTRACT

A method for manufacturing a model of an anatomical feature comprises utilizing a stereographic digital image camera at a plurality of different vantage points relative to a reference anatomical feature to capture a plurality of three dimensional digital image pairs of a corresponding plurality of external surface portions of the reference anatomical feature including concavities and convexities of complex anatomical surfaces, and processing the plurality of three dimensional digital image pairs to produce a three dimensional digital surface image of the reference anatomical feature and a corresponding data file. A modified three dimensional digital surface image and corresponding modified data file may be produced by utilizing one or more of selecting a portions of said three dimensional digital surface image, scaling the three dimensional digital surfaced image, and generating a mirror image of the three dimensional digital surface image.

74 Claims, 9 Drawing Sheets

(56) References Cited

U.S. PATENT DOCUMENTS

| | | | | |
|---|---|---|---|---|
| 2012/0301013 A1* | 11/2012 | Gu | ........................ | G01B 11/25 |
| | | | | 382/154 |
| 2014/0230489 A1* | 8/2014 | Milanov | ................ | A44C 27/00 |
| | | | | 63/14.1 |
| 2015/0170416 A1* | 6/2015 | McGregor | .............. | G06T 19/20 |
| | | | | 345/420 |

* cited by examiner

METHOD OF MANUFACTURE OF A SURGICAL MODEL FOR AN ANATOMICAL FEATURE

FIELD

This invention pertains to models of anatomical features, in general, and to surgical models utilized in reconstruction of anatomical features, in particular.

BACKGROUND

Surgical reconstruction of anatomical features is typically used to correct for deformities or abnormalities that are congenital or a result of trauma, such as an accident or mauling by an animal, or as a result of disease. In some cases, the entire anatomical feature is reconstructed whereas in other cases only a portion of the anatomical feature is reconstructed.

Exemplary of such reconstruction is reconstruction of a microtic external ear. Microtia is a congenital deformity where the pinna (external ear) is underdeveloped.

Surgical reconstruction of the microtic external ear utilizing a rib cartilage graft is an approach that is utilized. The surgery involves sculpting the patient's own rib cartilage into the form of an ear. If the patient is a child, because the cartilage is the patient's own living tissue, the reconstructed ear continues to grow as the child does. The major advantage of this surgery is that the patient's own tissue is used for the reconstruction.

Surgeons may utilize a model of a patient's good ear as a guide for shaping the cartilage for the microtic ear reconstruction. The model that surgeons currently use is an autoclavable sheet of velum. The surgeon traces the arch of the good ear, and uses that as a guide for shaping the cartilage for the other ear.

It is desirable to provide surgeons with a method and apparatus for improved surgical models for use in surgical reconstruction, or in some instances construction, of anatomical features in whole or in part, in general, and of external ears, in particular.

SUMMARY

In accordance with the principles of the invention, a method is provided for manufacture of custom surgical models.

An embodiment of a method for manufacturing a model of an anatomical feature, in whole or in part, comprises utilizing a stereographic digital image camera at a plurality of different vantage points relative to a reference anatomical feature to capture a plurality of three dimensional digital image pairs of a corresponding plurality of external surface portions of the reference anatomical feature, and processing the plurality of three dimensional digital image pairs to produce a three dimensional digital surface image of the reference anatomical feature and a corresponding data file.

In various embodiments, the method comprises utilizing the data file to manufacture the model. The model may be one or both of a positive and negative model.

In at least one embodiment, the method comprises providing the data file to a three dimensional printer, and utilizing the three dimensional printer to manufacture the model.

In embodiments the model is a surgical model and the method may include manufacturing the model from an autoclavable material. In various embodiments, the reference anatomical feature is an ear.

The method may include modifying the data file to provide a modified data file by one or more of selecting only a portion of the three dimensional digital image, scaling the three dimensional digital surface image, and forming a mirror image of the three dimensional digital surface image.

The model may comprise providing the modified data file to a three dimensional printer and utilizing the three dimensional printer to manufacture the model.

An embodiment of the method may comprise: processing the plurality of the three dimensional digital image pairs to produce three dimensional digital image surface portions each corresponding to one of the plurality of external surface portions of the reference anatomical feature; registering each of the three dimensional digital image surface portions to provide registered three dimensional image surface portions; and fusing together the registered three dimensional digital image surface portions to generate the three dimensional digital surface image of the reference anatomical portion and the data file.

In an embodiment, the registering step comprises utilizing one or more identified deformable and non-deformable surface portions captured in the three dimensional image surface portions for registration of the three dimensional image portions.

In an embodiment, the method further comprises cropping each of the plurality of three dimensional image portions.

A system for manufacturing a model of an anatomical feature comprises a stereographic digital image camera operable to capture a three dimensional digital image pair and a processor. The stereographic digital image camera is positioned at a plurality of different vantage points relative to a reference anatomical feature. The stereographic digital image camera is operated at each of the plurality of different vantage points to capture a corresponding plurality of three dimensional digital image pairs. Each of the plurality of three dimensional digital image pairs corresponds to a different external surface portion of the reference anatomical feature. The processor receives the plurality of three dimensional digital image pairs and is operable to process the plurality of three dimensional digital image pairs to produce a three dimensional surface digital image surface of the reference anatomical feature and a corresponding data file.

The processor is operable to process each of the three dimensional digital image pairs to produce corresponding three dimensional digital image portions of the reference anatomical feature.

The processor is operable to combine the corresponding three dimensional digital image portions to form the three dimensional surface digital image of the reference anatomical feature and the corresponding data file.

The three dimensional digital surface image of the anatomical feature and the corresponding data file each comprise one or both of a positive and negative of the anatomical feature.

In one embodiment, the anatomical feature is an ear.

The system may comprise manufacturing apparatus operable on the data file to manufacture the model.

The system may comprise a three dimensional printer operable to utilize the data file to manufacture the model.

The model may be a surgical model and may comprise an autoclavable material.

In an embodiment, the system comprises input/output apparatus coupled to the processor for initiating commands to the processor and viewing representations of the results of the commands; a memory; and one or more first programs stored in the memory and executable by the processor in response to corresponding one or more commands to modify the three dimensional digital image and the data file to provide a modified three dimensional digital image and a modified data file by selecting one or more of a portion of said three dimensional digital image, scaling the three dimensional digital image and forming a mirror image of the three dimensional digital image.

The modified three dimensional digital image and the modified corresponding data file each comprise one or both of a positive and negative of the anatomical feature.

In an embodiment, the system comprises a memory; and one or more programs stored in the memory and executable by the processor in response to corresponding one or more first commands to: process the plurality of the three dimensional digital image pairs to produce a corresponding plurality of three dimensional digital image portions of the anatomical feature; register each of the three dimensional digital image portions to provide registered three dimensional image portions; and fuse together the registered three dimensional digital image portions to generate the three dimensional digital image of the anatomical feature and the data file.

In an embodiment the memory comprises one or more programs stored in the memory and executable by the processor in response to corresponding one or more commands to modify the three dimensional digital image and the data file to provide a modified three dimensional image and a modified data file by one or both of scaling the three dimensional digital image and forming a mirror image of the three dimensional digital image.

In various embodiments, the processor is operable to register the three dimensional digital image portions utilizing one or more non-deformable and deformable anatomical surface section or sections captured in the three dimensional digital image portions.

In various embodiments, the processor is operable to crop one or more of the plurality of three dimensional image portions.

A surgical model of an ear is manufactured by a process comprising the steps of: utilizing a stereographic digital image camera at a plurality of different vantage points relative to a reference ear to capture a plurality of three dimensional digital image pairs of a corresponding plurality of external surface portions of the reference ear including concavities and convexities of the ear and at least a portion of the external ear canal of the reference ear; processing the plurality of three dimensional digital image pairs to produce a three dimensional digital surface image of the reference ear comprising the concavities and convexities of the reference ear and the at least a portion of the external ear canal of the reference ear and a corresponding data file; and utilizing the data file to manufacture the surgical model, the model being one or both of a positive and negative model.

A surgical model of an ear may be manufactured in accordance with the process of further comprising the further step of modifying the data file to provide a modified data file. The modified data file may be produced by selecting one or more of a portion of the three dimensional digital surface image, scaling the three dimensional digital surface image, and forming a mirror image of the three dimensional digital surface image.

A surgical model of an ear may be manufactured in accordance with the process further comprising the further steps of providing the modified data file to a three dimensional printer, and utilizing the three dimensional printer to manufacture the model from a plastic material. The plastic material may be autoclavable.

A surgical model of an ear may be manufactured in accordance with the process further comprising processing the plurality of the stereographic digital image pairs to produce three dimensional digital image surface portions each corresponding to one of the plurality of external surface portions of the reference ear, registering each of the three dimensional digital image surface portions to provide registered three dimensional image surface portions, and fusing together the registered three dimensional digital image surface portions to generate the three dimensional digital surface image of the anatomical portion and the data file.

The registering step may comprise utilizing one or more non-deformable and deformable surface portions captured in the three dimensional image surface portions for registration of the three dimensional image portions.

BRIEF DESCRIPTION OF THE DRAWING

The invention will be better understood from a reading of the following detailed description in conjunction with the drawing figures in which like reference designators identify like elements and in which.

DETAILED DESCRIPTION

It will be appreciated by those skilled in the art that although the embodiment of the invention shown and described herein is directed to manufacture of surgical models of ears for plastic surgery to repair microtia, various other embodiments may be utilized to develop and/or to manufacture models that may be surgical models of other anatomical features.

In the embodiment described herein, a surgical model of an ear for a patient is developed utilizing a reference ear as the basis for the model. The reference ear may be a patient's good ear or in instances where a patient does not have a good ear, an ear from another person may be utilized as the reference ear to generate a model for one or both of a patient's ears. Alternatively, a data base of reference ears may be provided from which selection of one or both of a patient's ears may be selected and appropriately scaled for the patient. Still further, the data base may comprise other reference anatomical features that may be selected and appropriately scaled for a patient. Specific data files may be accessed from the data base by characterizing each reference anatomical feature with predetermined selection criteria based upon anatomical structural parameters. The selection of one or more reference anatomical features may be performed automatically based upon desired anatomical structural parameters that are normalized.

In developing the method and apparatus of the invention, prior systems utilizing a plurality of pairs of cameras in fixed position in relationship were utilized. However, these systems did not provide reliable results because the plurality of camera pairs could not capture every part of an ear including all of its concavities and convexities at the same time. The result was that part of an ear would image well but key image data was missing such as various convexities or concavities or the external ear canal.

Another approach attempted was to utilize handheld scanners. These systems project and scan a laser beam onto a surface and two cameras are utilized to capture the laser scan. However, these handheld scanners suffered from the same problem that resulted with the plurality of fixed position camera pairs. Although the laser is projected onto the surface of the ear, the two cameras that are in a fixed position with respect to the laser and consequently were not always able to have both cameras see the scanned laser, resulting in the failure to capture lots of data wherever both cameras did not see the laser scan including again convexities, concavities and the external ear canal.

Other imaging modalities were considered such as the use of CT and MRI scanning. However, these modalities require the use of sedation and/or exposure and are generally cost prohibitive for use in manufacturing a surgical model.

In accordance with the principles of the present invention, a single stereographic or three-dimensional digital camera is used. The term "stereographic digital camera" or "three dimensional digital camera" is used to describe a digital camera that is configured to acquire a plurality of two-dimensional views with identical magnification. The three-dimensional digital camera may simultaneously or sequentially at a high rate of speed record each of a plurality of two-dimensional images. Various stereographic or three-dimensional digital cameras are known in the prior art as are three dimensional lens attachments to digital cameras that convert the two dimensional digital camera into a stereographic or three dimensional digital camera. In one specific embodiment of the invention, a conventional single lens reflex (SLR) digital camera with removable lens capability is provided with a stereographic or three dimensional lens, referred to by some suppliers as a "stereo lens". In that embodiment, the stereographic digital camera captures a pair of two-dimensional images simultaneously.

After a stereographic camera captures three dimensional image pairs, the image pairs may either be stored in a memory carried by the camera, such as, for example, a memory card or the digital images may be transmitted to a processor either via cabling or via a wireless link or via a combination of one or more wireless links and a wired or cable link.

Figure 1:
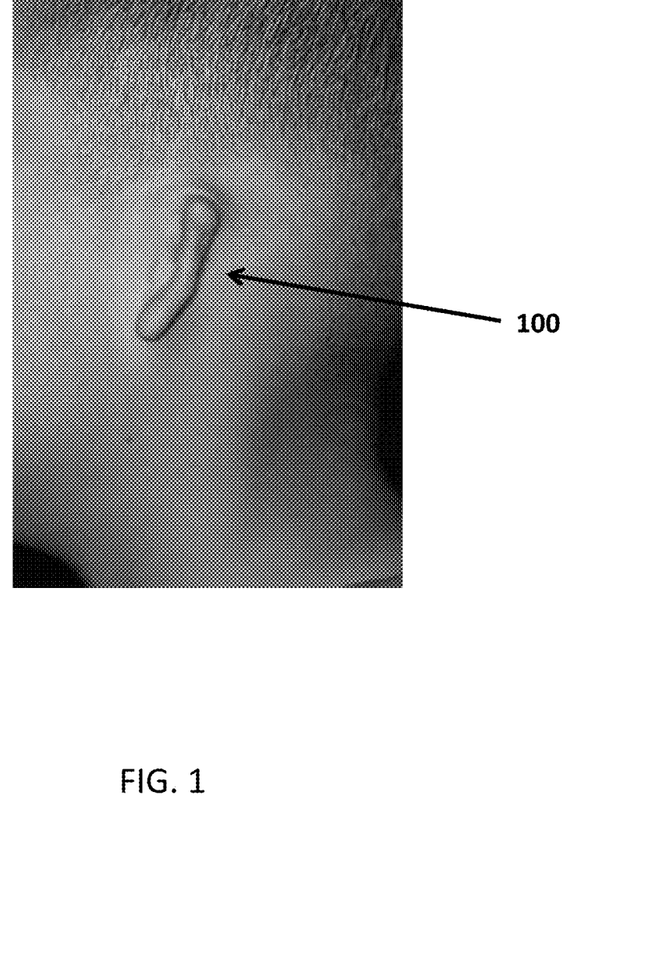
FIG. 1 is an image of a microtic left ear.

In accordance with the principles of the invention, a method is provided for manufacture of custom models of anatomical features. More specifically, the method of one embodiment is directed to the manufacture of a surgical model of an ear for a patient having microtia. FIG. 1 illustrates the ear 100 of a microtic ear.

Figure 2:
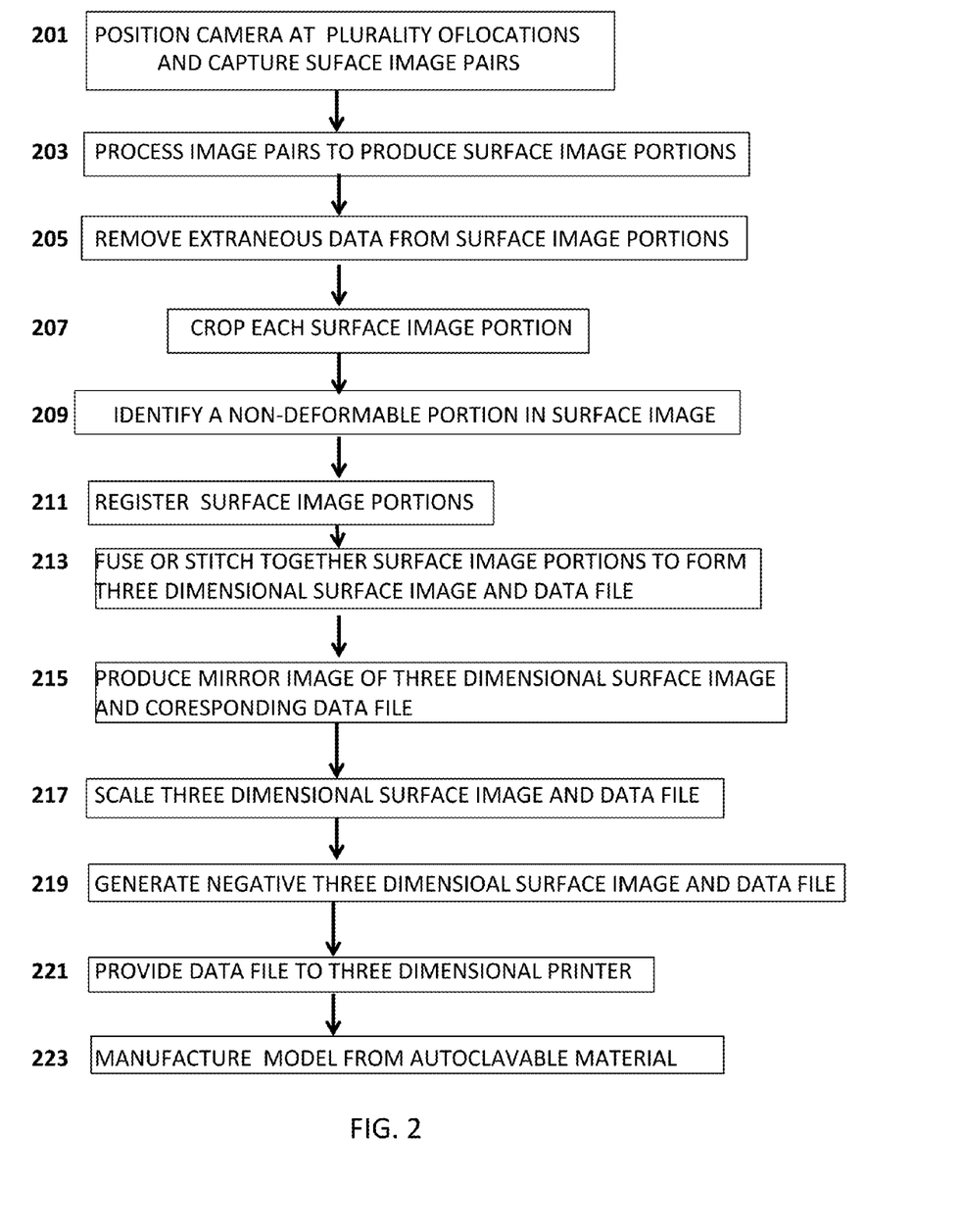
FIG. 2 illustrates method steps.
Figure 3:
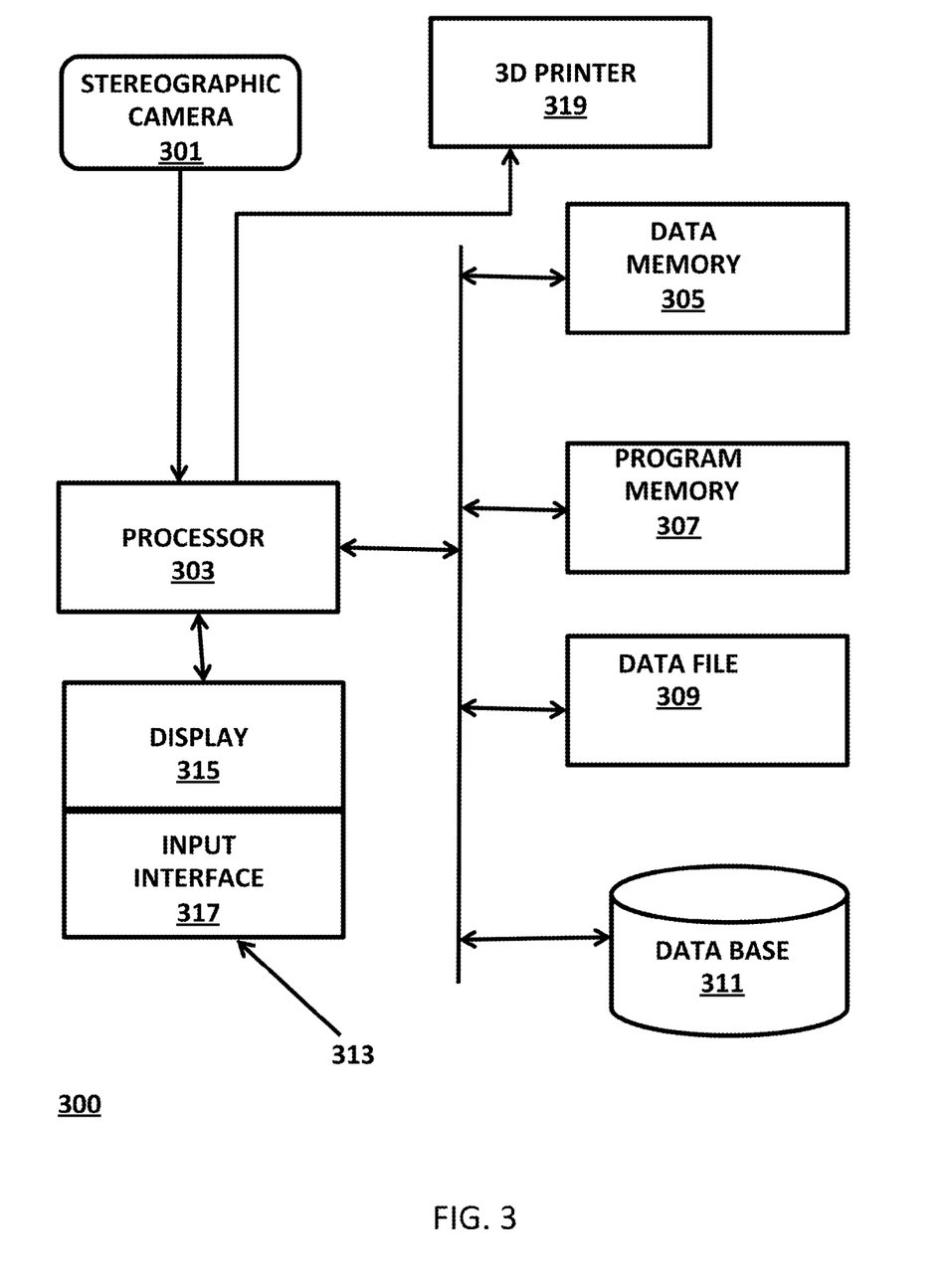
FIG. 3 is a block diagram of a system.
Figure 4A:
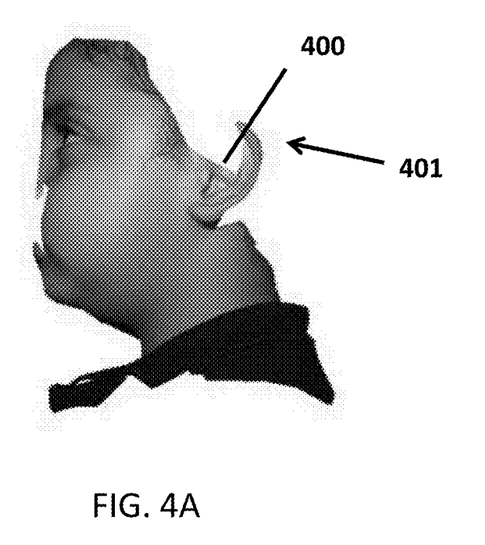
FIGS. 4A, 4B, 4C and 4D are image portions of a reference ear.
Figure 4B:
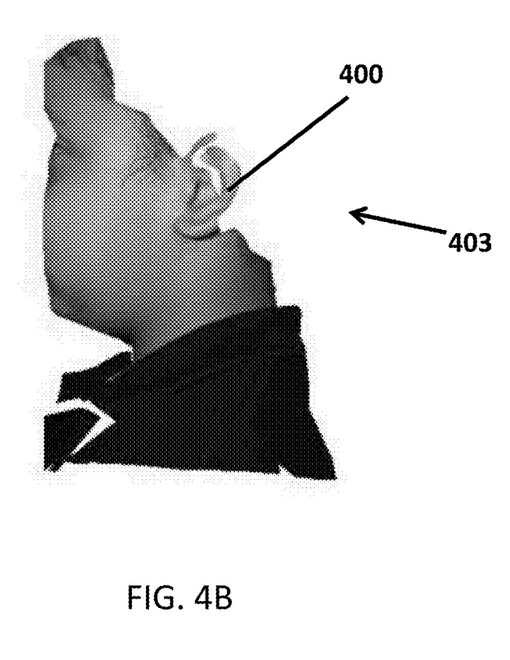
Figure 4C:
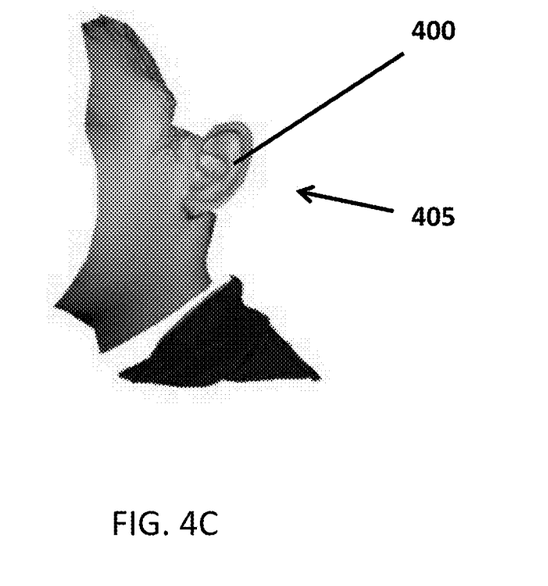
Figure 4D:
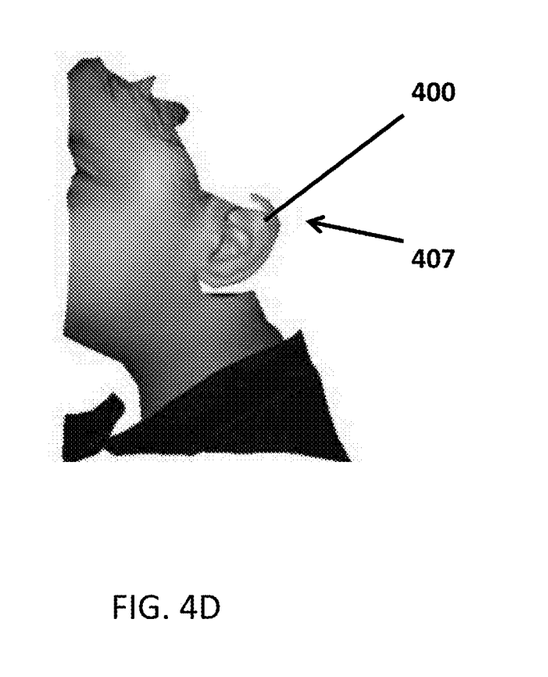

FIG. 2 illustrates steps in the methodology of an embodiment and FIG. 3 illustrates a representative system 300.

In the embodiment of a method for manufacturing a model of an anatomical feature, the method comprises utilizing a stereographic digital image camera. At step 201 in FIG. 2, a stereographic digital image camera 301 as shown in FIG. 3 is positioned at a plurality of different vantage points relative to a reference anatomical feature, in the case of this embodiment, a patient's good ear. Digital surface image pairs of the reference anatomical feature are captured by stereographic digital image camera 301 at each of the different vantage points. Positioning stereographic digital camera 301 at the different vantage points provides for capturing all the complex surface geometry of the reference anatomical feature, e.g., an ear, including all surface concavities and convexities. By utilizing a single stereographic digital image camera 301, the camera operator can determine the part of the reference anatomical feature that is being captured, how close or far the stereographic digital image camera 301 is from the reference anatomical feature, the angle at which stereographic digital image camera 301 is imaging the anatomical feature, etc.

The digital surface image pairs are provided to system 300 shown in FIG. 3. System 300 comprises a processor 303, a data memory 305 for storing the digital surface image pairs received from stereographic digital image camera 301, a program memory 307 comprising various programs for processing digital surface image pairs, a data file memory 309 storing processed digital surface image pairs, and a data base 311 utilized to store a library of digital surface image data files for a plurality of different anatomical features. It will be appreciated by those skilled in the art that although data memory 305, program memory 307, data file 309 and data base 311 are shown as separate memories in FIG. 3, these memories may comprise portions of one or more physical memories. Associated with processor 301 is an input output interface 313. Input/output interface 313 comprises a display 315 and an input interface 317. Display 315 may be any one of a number of conventional displays, and input interface 317 may be any one or more of a number of conventional input apparatus. Display 315 may be a "touch screen" having an integrated input interface.

Processor 303, utilizing a program from program memory 307 is utilized to process each digital surface image pair to generate a three dimensional digital surface image portion of the ear at step 203. FIG. 4 shows display 315 having three dimensional digital image surface portions 401, 403, 405, 407 for an ear 400 displayed thereon. Each surface portion 401, 403, 405, 407 is a surface portion image of ear 400 captured from a different vantage point. The corresponding data file for each surface image portion 401, 303, 405, 407 is stored in data memory 305.

Turning back to FIG. 2, each digital surface image portion is cleaned by removing extraneous data at step 205. The cleaning operation may be done via selection of extraneous portions by a system operator viewing each surface image portion 401, 403, 405, 407 on display 315 and utilizing input apparatus 313 to select the data portion to be deleted by processor 303. In other embodiments, processor 303 may be programmed to either automatically delete extraneous portions or may be operated semi-automatically in combination with manual selection by a system operator.

Figure 5:
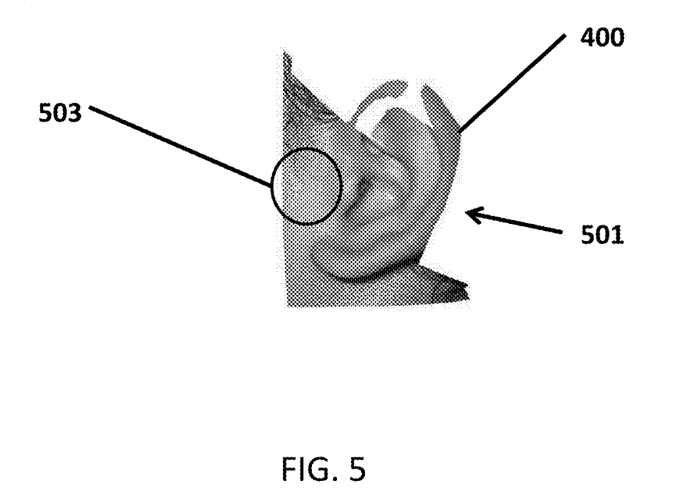
FIG. 5 is an image of a cropped and cleaned image portion of the reference ear.

At step 207, each digital surface image portion is cropped such that only the portion of the anatomical feature or ear 400 that is of interest is retained. FIG. 5 shows a digital surface image portion 501 that has been cleaned and cropped.

Figure 6:
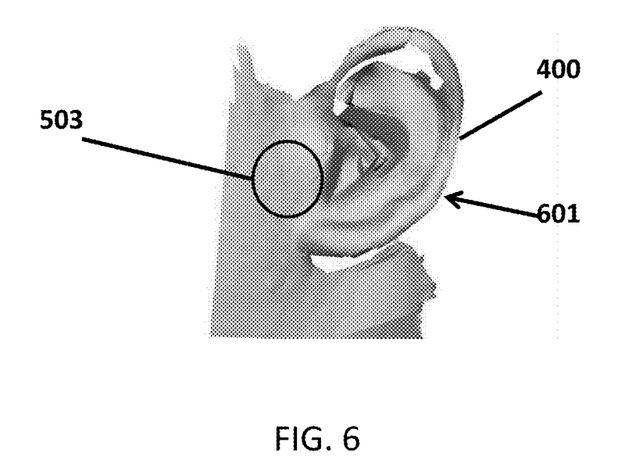
FIG. 6 illustrates a plurality of image portions aligned and registered.

Each cleaned and cropped digital surface image portion is then aligned and registered. FIG. 6 shows digital surface image portion 501 aligned and registered. It was determined that the alignment and registration of the digital surface image portions are more easily aligned by determining whether there is a non-deformable or deformable portion in the various digital surface image portions that may be used. At step 209 in FIG. 2 this reference portion is identified. For ear 400, it was determined that portion 503 of the subject's head in front of ear 400 was a non-deformable portion that is utilizable reference portion that facilitate alignment and registration.

In alternate embodiments best-fit algorithms may be utilized to provide registration and alignment with deformable surfaces. For example, the pina is often exactly the same size and shape from multiple views and may be used for registration of the digital surface image portions.

Figure 7:
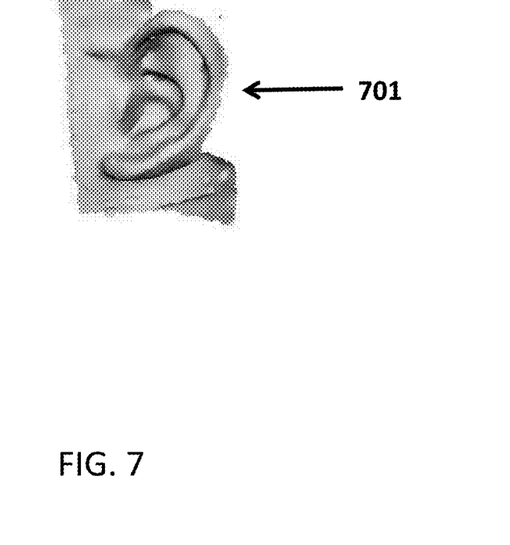
FIG. 7 illustrates a plurality of image portions "fused" together.

After all the digital surface image portions are registered and aligned at step 211, the digital surface image portions are, in step 213, stitched or fused together to form a single three dimensional surface image 701 shown in FIG. 7 of the entire surface of the anatomical feature or ear. The resulting data file of the single three dimensional surface image 701 is stored in data file 309 and may also be stored in data base 311 shown in FIG. 3.

In other embodiments different alignment and registration techniques may be employed including surface matching least squared, registration by identification and selection of key landmarks, or other mathematical approaches.

Figure 8:
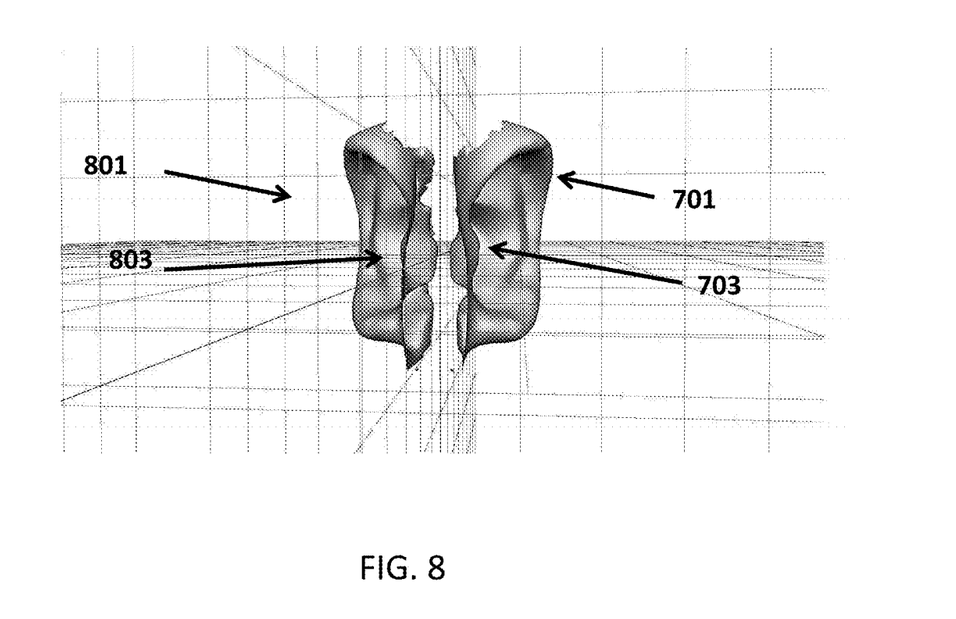
FIG. 8 illustrates a reference ear and a mirror image ear.

At step 215, system 300 may then be utilized to modify three dimensional surface image 701 and corresponding data file to generate a three dimensional mirror surface image 801 and a corresponding data file. By generating a three dimensional mirror surface image 801, a patient's good ear can be used to generate a model for the patient's microtic ear. As is apparent from FIG. 8, the three dimensional surface image 701 and the three dimensional mirror surface image captures the complex convexities and concavities of the patient's ear including into the external ear canal 703, 803.

Figure 9:
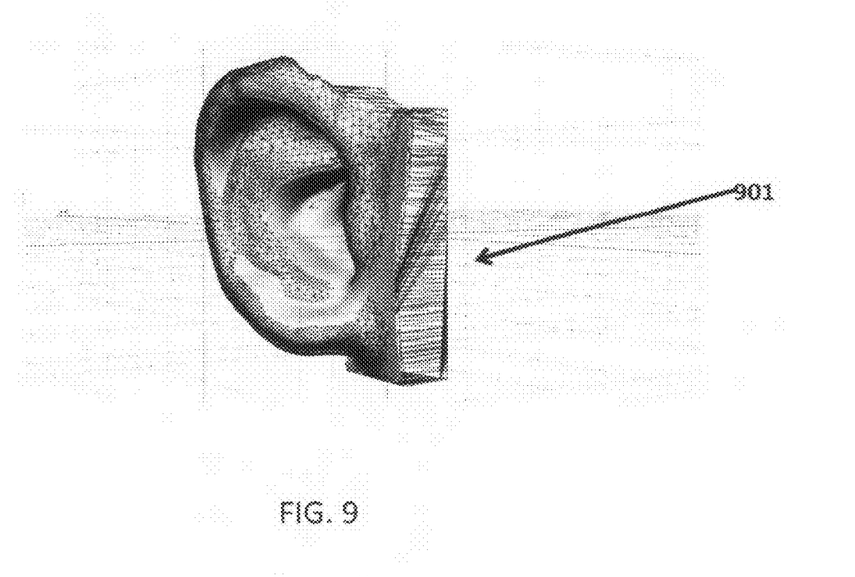
FIG. 9 illustrates the mirror image ear of FIG. 8 scaled for growth.

At step 217, system 300 may also be utilized to scale the three dimensional mirror surface image and corresponding data file to a generate a proportionately scaled three dimensional mirror surface image 901 shown in FIG. 9 and a corresponding data file 309 shown in FIG. 3. Scaling is provided to accommodate for the growth of the patient.

An additional modification to the three dimensional surface image and corresponding data file may be provided for instances in which the model is to be for only a portion of the anatomical feature. For example, where only a portion of the anatomical feature needs surgical reconstruction, the modification may comprise selecting a portion of the three dimensional surface image and its corresponding data file for manufacture of a model of the desired portion of the anatomical feature.

Figure 10:
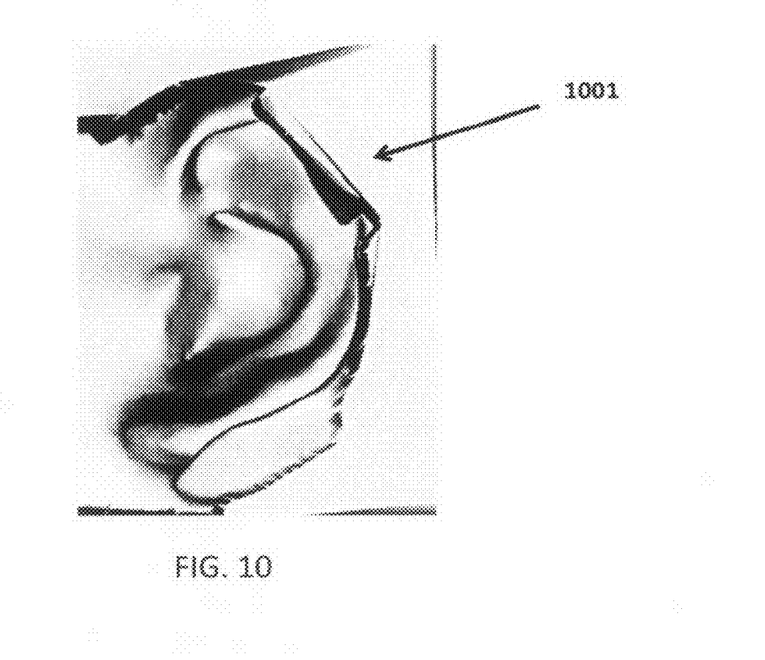
FIG. 10 illustrates a negative of the mirror image ear of FIG. 9.

At step 219, system 300 may be utilized to generate a negative three dimensional surface image 1001 of three dimensional mirror surface image 901 and a corresponding data file. The data file containing scaled three dimensional mirror surface image 901 is modified to include both the data file for the three dimensional mirror surface image 901 and the data file corresponding to the negative three dimensional surface image 1001. The resulting data file 309 is stored in data base 311. As used herein, a negative of an image or model will be understood to mean that for an anatomical feature, the negative corresponds to the equivalent of a mold for the anatomical feature. The provision of a negative of an anatomical feature such as an ear will permit the plastic surgeon to place a sculpted piece of cartilage into the mold to make sure that the sculpted piece does in fact match the shape of the anatomical feature. In addition, a negative may be utilized as a mold into which plastic material may be cast to produce a positive autoclavable model.

System 300 may then be utilized to manufacture a model of the positive scaled three dimensional mirror surface image 901 and/or negative scaled three dimensional mirror surface image 1001. More specifically, system 300 may further include manufacturing apparatus operable to utilize data file 309 to manufacture a model of the scaled three dimensional mirror surface image 901 and/or negative scaled three dimensional mirror surface image 1001.

Figure 11:
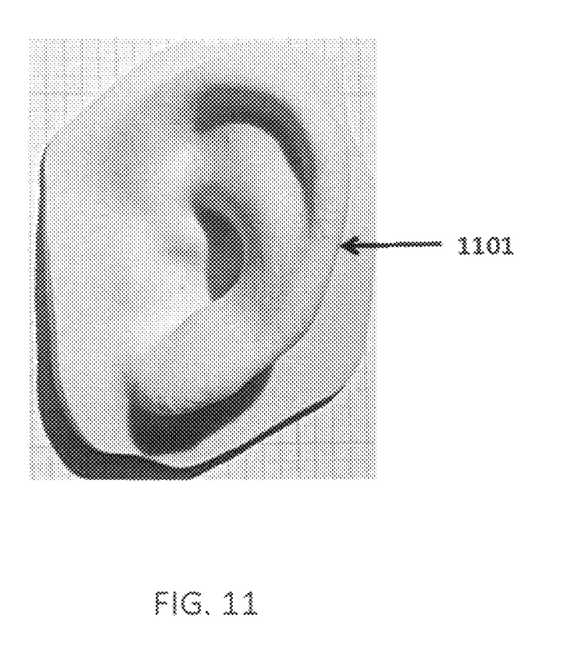
FIG. 11 shows a positive manufactured ear model.

In the embodiment, system 300 of FIG. 3 comprises a three dimensional printer 319. At step 221 in FIG. 2, system 300 provides data file 309 to three dimensional printer 319. Three dimensional printer 319 utilizes data file 319, at step 223 of FIG. 2, to print three dimensional mirror surface image 901 in plastic material. Although system 300 of the embodiment is capable of manufacturing a model comprising one or both of a positive three dimensional mirror surface image 901 and negative three dimensional mirror surface image 1001, for clarity only a positive three dimensional mirror surface image model 1101 is shown in FIG. 11. It is also noted that the model shown in FIG. 11 is for a different ear than shown in the other drawing figures, but is representative of such a model.

It will be appreciated by those skilled in the art that although the embodiment shown utilizes a three dimensional printer, other manufacturing apparatus may be utilized, including, but not limited to, subtractive type machining apparatus.

The plastic material utilized to form three dimensional mirror surface image model 1101 is selected to be autoclavable such that the resulting model is appropriate for use as a surgical model.

Figure 12:
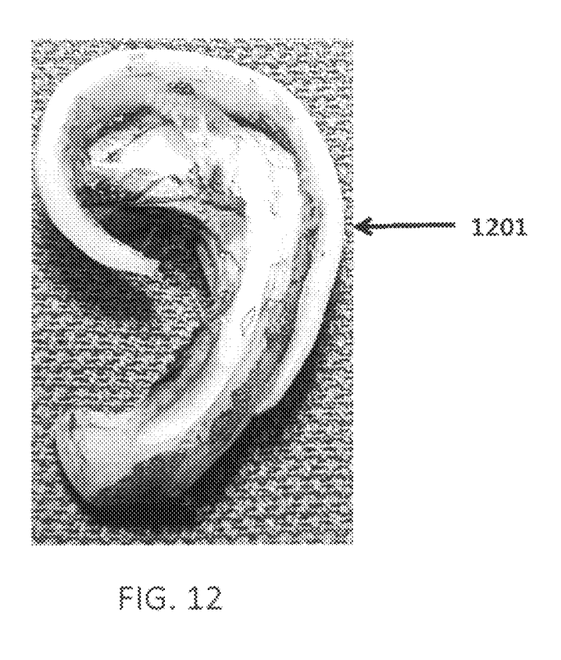
FIG. 12 illustrates a piece of cartilage shaped based upon the positive manufactured ear model of FIG. 9.

A plastic surgeon may utilize the three dimensional surface image model 1101 to shape a piece of cartilage 1201 in the shape of the ear as shown in FIG. 12. By providing a surgical model that is one or both of a positive and negative of the desired ear shape, the plastic surgeon will be better able to provide the patient with an ear that closely mirrors the patient's good ear.

In other embodiments of the invention, data base 311 may comprise a plurality of three dimensional surface image data files for ears that are categorized according to predetermined criteria or characteristics. Such a data base may be useful for providing models for both ears for a patient who needs construction or reconstruction of both external ears.

It will be understood by those skilled in the art that although the embodiment of the invention shown and described is directed to manufacturing a model of an ear, the method and apparatus may be utilized to capture three dimensional surface images and data files of other anatomical features, including by non-limiting example, a nose.

It will be further understood by those skilled in the art that various changes and modifications may be made to the method and apparatus of the invention without departing from its spirit or scope. It is intended that the invention not be limited to the embodiments shown and described herein, but that the invention be given the broadest possible scope permissible by law and that the invention is to be limited in scope only by the claims appended hereto.

What is claimed is:

1. A method for manufacturing a model of an anatomical feature of a subject, comprising:
utilizing a stereographic digital image camera at a plurality of different vantage points relative to a reference anatomical feature to capture a plurality of three dimensional digital image pairs of a corresponding plurality of external surface portions of said reference anatomical feature;

and processing said plurality of three dimensional digital image pairs to produce a three dimensional digital surface image of said reference anatomical feature and a corresponding data file, said processing comprises:

processing said plurality of said stereographic digital image pairs to produce three dimensional digital image surface portions each corresponding to one of said plurality of external surface portions of said reference anatomical feature; and identifying one or more identified non-deformable and deformable surface portions of said subject captured in said three dimensional image surface portions for registration of said three dimensional image portions.

2. A method in accordance with claim 1, comprising:
utilizing said data file to manufacture said model, said model being one or both of a positive and negative model.

3. A method in accordance with claim 2, comprising:
providing said data file to a three dimensional printer; and
utilizing said three dimensional printer to manufacture said model.

4. A method in accordance with claim 2, wherein:
said model is a surgical model.

5. A method in accordance with claim 2, comprising:
manufacturing said model from an autoclavable material.

6. A method in accordance with claim 2, wherein:
said anatomical feature is an ear.

7. A method in accordance with claim 1, comprising:
modifying said data file to provide a modified data file.

8. A method in accordance with claim 7, comprising:
modifying said data file by one or more of selecting a portion of said three dimensional digital surface image, scaling said three dimensional digital surface image, and forming a mirror image of said three dimensional digital surface image.

9. A method in accordance with claim 7, comprising:
utilizing said modified data file to manufacture said model, said model being one or both of a positive and negative model.

10. A method in accordance with claim 9, comprising:
providing said modified data file to a three dimensional printer; and
utilizing said three dimensional printer to manufacture said model.

11. A method in accordance with claim 7, wherein:
said model is a surgical model.

12. A method in accordance with claim 7, comprising:
manufacturing said model from an autoclavable material.

13. A method in accordance with claim 7, wherein:
said anatomical feature is an ear.

14. A method in accordance with claim 1, wherein, said processing comprises:

registering each of said three dimensional digital image surface portions to provide registered three dimensional image surface portions; and fusing together said registered three dimensional digital image surface portions to generate said three dimensional digital surface image of said anatomical portion and said data file.

15. A method in accordance with claim 14, comprising:
utilizing said data file to manufacture said model, said model being one or both of a positive and negative model.

16. A method in accordance with claim 15, comprising:
providing said data file to a three dimensional printer; and
utilizing said three dimensional printer to manufacture said model.

17. A method in accordance with claim 14, wherein:
said model is a surgical model.

18. A method in accordance with claim 14, comprising:
manufacturing said model from an autoclavable material.

19. A method in accordance with claim 14, wherein:
said anatomical feature is an ear.

20. A method in accordance with claim 14, comprising:
modifying said data file to provide a modified data file.

21. A method in accordance with claim 20, comprising:
modifying said data file by one or more of selecting a portion of said three dimensional digital surface image, scaling said three dimensional digital surface image, and forming a mirror image of said three dimensional digital surface image.

22. A method in accordance with claim 20, comprising:
utilizing said modified data file to manufacture said model, said model being one or both of a positive and negative model.

23. A method in accordance with claim 20, comprising:
providing said modified data file to a three dimensional printer; and
utilizing said three dimensional printer to manufacture said model.

24. A method in accordance with claim 20, wherein:
said model is a surgical model.

25. A method in accordance with claim 20, comprising:
manufacturing said model from an autoclavable material.

26. A method in accordance with claim 20, wherein:
said anatomical feature is an ear.

27. A method in accordance with claim 14, wherein:
said registering step comprises utilizing one or more identified non-deformable and deformable surface portions captured in said three dimensional image surface portions.

28. A method in accordance with claim 27, comprising:
utilizing said data file to manufacture said model, said model being one or both of a positive and negative model.

29. A method in accordance with claim 28, comprising:
providing said data file to a three dimensional printer; and
utilizing said three dimensional printer to manufacture said model.

30. A method in accordance with claim 27, wherein:
said model is a surgical model.

31. A method in accordance with claim 27, comprising:
manufacturing said model from an autoclavable material.

32. A method in accordance with claim 14, wherein:
said anatomical feature is an ear.

33. A method in accordance with claim 27, comprising:
modifying said data file to provide a modified data file.

34. A method in accordance with claim 33, comprising:
modifying said data file by one or more of selecting a portion of said three dimensional digital surface image, scaling said three dimensional digital surface image, and forming a mirror image of said three dimensional digital surface image.

35. A method in accordance with claim 34, comprising:
utilizing said data file to manufacture said model, said model being one or both of a positive and negative model.

36. A method in accordance with claim 34, comprising:
providing said data file to a three dimensional printer; and
utilizing said three dimensional printer to manufacture said model.

37. A method in accordance with claim 34, wherein:
said model is a surgical model.

38. A method in accordance with claim 34, comprising:
manufacturing said model from an autoclavable material.

39. A method in accordance with claim 34, wherein:
said anatomical feature is an ear.

40. A method in accordance with claim 27, comprising:
cropping each of said plurality of three dimensional image surface portions.

41. A method in accordance with claim 40, comprising:
utilizing said data file to manufacture said model, said model being one or both of a positive and negative model.

42. A method in accordance with claim 41, comprising:
providing said data file to a three dimensional printer; and
utilizing said three dimensional printer to manufacture said model.

43. A method in accordance with claim 40, wherein:
said model is a surgical model.

44. A method in accordance with claim 40, comprising:
manufacturing said model from an autoclavable material.

45. A method in accordance with claim 40, wherein:
said anatomical feature is an ear.

46. A method in accordance with claim 14, comprising:
cropping each of said plurality of three dimensional image surface portions.

47. A method in accordance with claim 46, comprising:
utilizing said data file to manufacture said model, said model being one or both of a positive and negative model.

48. A method in accordance with claim 44, comprising:
providing said data file to a three dimensional printer; and
utilizing said three dimensional printer to manufacture said model.

49. A method in accordance with claim 47, wherein:
said model is a surgical model.

50. A method in accordance with claim 47, comprising:
manufacturing said model from an autoclavable material.

51. A method in accordance with claim 47, wherein:
said anatomical feature is an ear.

52. A method in accordance with claim 46, wherein:
said registering step comprises utilizing an anatomical shape of said ear and said one or more non-deformable and deformable surface portions captured in said three dimensional image.

53. A method in accordance with claim 52, comprising:
utilizing said data file to manufacture said model, said model being one or both of a positive and negative model.

54. A method in accordance with claim 53, comprising:
providing said data file to a three dimensional printer; and
utilizing said three dimensional printer to manufacture said model.

55. A method in accordance with claim 53, wherein:
said model is a surgical model.

56. A method in accordance with claim 53, comprising:
manufacturing said model from an autoclavable material.

57. A method in accordance with claim 53, wherein:
said anatomical feature is an ear.

58. A method in accordance with claim 14, wherein:
said registering step comprises utilizing an anatomical shape of said ear and said one or more non-deformable and deformable surface portions captured in said three dimensional surface image portions for registration of said three dimensional surface image portions.

59. A method in accordance with claim 58, comprising:
utilizing said data file to manufacture said model, said model being one or both of a positive and negative model.

60. A method in accordance with claim 59, comprising:
providing said data file to a three dimensional printer; and
utilizing said three dimensional printer to manufacture said model.

61. A method in accordance with claim 59, wherein:
said model is a surgical model.

62. A method in accordance with claim 59, comprising:
manufacturing said model from an autoclavable material.

63. A method in accordance with claim 59, wherein:
said anatomical feature is an ear.

64. A surgical model of an ear manufactured by a process comprising the steps of:
utilizing a stereographic digital image camera at a plurality of different vantage points relative to a reference ear to capture a plurality of three dimensional digital image pairs of a corresponding plurality of external surface portions of said reference ear including concavities and convexities of said ear and at least a portion of the external ear canal of said reference ear;
processing said plurality of three dimensional digital image pairs to produce a three dimensional digital surface image of said reference ear comprising said concavities and convexities of said reference ear and said at least a portion of the external ear canal of said reference ear and a corresponding data file;
said processing said plurality of said stereographic digital image pairs comprises:
producing three dimensional digital image surface portions each corresponding to one of said plurality of external surface portions of said reference ear;
identifying one or more non-deformable and deformable surface portions of said subject captured in said three dimensional image surface portions for registration of said three dimensional digital image surface portions;
utilizing said one or more non-deformable and deformable surface portions for registration of said three dimensional image portions; and
utilizing said data file to manufacture said surgical model, said model being one or both of a positive and negative model.

65. A surgical model of an ear manufactured in accordance with the process of claim 64, comprising the further step of:
modifying said data file to provide a modified data file by one or more of selecting a portion of said three dimensional digital surface image, scaling said three dimensional digital surface image and forming a mirror image of said three dimensional digital surface image.

66. A surgical model of an ear manufactured in accordance with the process of claim 65, comprising the further steps of:
providing said modified data file to a three dimensional printer; and
utilizing said three dimensional printer to manufacture said model from a plastic material.

67. A surgical model of an ear manufactured in accordance with the process of claim 66, wherein:
said plastic material is autoclavable.

68. A surgical model of an ear manufactured in accordance with the process of claim 67, further comprising the steps of:

registering each of said three dimensional digital image surface portions to provide registered three dimensional image surface portions; and fusing together said registered three dimensional digital image surface portions to generate said three dimensional digital surface image of said anatomical portion and said data file.

69. A surgical model of an ear manufactured in accordance with the process of claim 64, wherein:

said surgical model comprises a plastic material.

70. A surgical model of an ear manufactured in accordance with the process of claim 69, wherein:

said plastic material is autoclavable.

71. A surgical model of an ear manufactured in accordance with the process of claim 64, further comprising the steps of:

registering each of said three dimensional digital image surface portions to provide registered three dimensional image surface portions; and fusing together said registered three dimensional digital image surface portions to generate said three dimensional digital surface image of said reference ear and said data file.

72. A surgical model of an ear manufactured in accordance with the process of claim 71, wherein:

said registering step comprises utilizing said one or more non-deformable and deformable surface portions captured in said three dimensional image surface portions for registration of said three dimensional image portions.

73. A surgical model of an ear manufactured in accordance with the process of claim 72, wherein:

said surgical model comprises a plastic material.

74. A surgical model of an ear manufactured in accordance with the process of claim 73, wherein:

said plastic material is autoclavable.

* * * * *